United States Patent
Haruki et al.

(10) Patent No.: US 8,868,952 B2
(45) Date of Patent: Oct. 21, 2014

(54) CONTROLLER AND PROGRAM PRODUCT

(75) Inventors: Hiroyoshi Haruki, Kanagawa (JP); Koichi Fujisaki, Kanagawa (JP); Satoshi Shirai, Kanagawa (JP); Masaya Tarui, Kanagawa (JP); Akihiro Shibata, Tokyo (JP); Tetsuro Kimura, Tokyo (JP); Tatsunori Kanai, Kanagawa (JP); Haruhiko Toyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 367 days.

(21) Appl. No.: 13/345,824

(22) Filed: Jan. 9, 2012

(65) Prior Publication Data

US 2012/0246501 A1 Sep. 27, 2012

(30) Foreign Application Priority Data

Mar. 24, 2011 (JP) ................................. 2011-065704

(51) Int. Cl.
*G06F 1/32* (2006.01)
*G06F 9/48* (2006.01)

(52) U.S. Cl.
CPC ............ *G06F 9/4893* (2013.01); *Y02B 60/144* (2013.01); *G06F 1/3287* (2013.01); *Y02B 60/32* (2013.01); *G06F 1/3243* (2013.01); *G06F 1/3228* (2013.01); *G06F 1/324* (2013.01)
USPC ......................................... 713/323; 713/320

(58) Field of Classification Search
CPC .................................................... G06F 1/3228
USPC ................................................. 713/323, 320
See application file for complete search history.

(56) References Cited

U.S. PATENT DOCUMENTS

| | | | |
|---|---|---|---|
| 6,889,331 B2 | 5/2005 | Soerensen et al. | |
| 7,360,106 B2 * | 4/2008 | Kato et al. | 713/323 |
| 7,386,853 B2 | 6/2008 | Hanzawa | |
| 8,181,051 B2 * | 5/2012 | Barth | 713/323 |
| 2006/0031692 A1 | 2/2006 | Kato et al. | |
| 2012/0166833 A1 | 6/2012 | Iwai et al. | |

FOREIGN PATENT DOCUMENTS

| | | |
|---|---|---|
| JP | 03-171217 | 7/1991 |
| JP | 2003029886 | 1/2003 |
| JP | 2009-064456 | 3/2009 |
| JP | 2010-113641 | 5/2010 |
| JP | 4644747 | 12/2010 |

OTHER PUBLICATIONS

Sunata, Tetsuya, et al.; "Resource Management of Operating System for Fine Grain Power Gating Control", IPSJ SIG vol. 2010-OS-114 No. 8; 2010.

(Continued)

*Primary Examiner* — Albert Wang
(74) *Attorney, Agent, or Firm* — Amin, Turocy & Watson, LLP

(57) ABSTRACT

According to one embodiment, a controller includes a state detecting unit, a calculating unit, and a determining unit. The state detecting unit detects an idle state in which indicates there are no process that can execute on a processing device capable of performing one or more processes. The calculating unit calculates a resuming time, which indicates a time length until the next process starts, when the state detecting unit detects the idle state. The determining unit determines an operation mode of the processing device on the basis of the resuming time calculated by the calculating unit.

8 Claims, 19 Drawing Sheets

(56) References Cited

OTHER PUBLICATIONS

Intel Document No. 316745-005, Intel Low Power Features "Clock Control and Low Power States", pp. 11-17.
Japanese Office Action for Japanese Application No. 2011-065704 mailed on Nov. 13, 2012.
English Translation of Japanese Office Action of Notice of Rejection for Application No. 2011-065704 Dated Feb. 12, 2013, 10 pgs.
Office Action for Taiwanese Patent Application No. 101105893 Dated Mar. 26, 2014, 12 pgs.
Chinese Office Action for Chinese Application No. 201210080362.7 mailed Jun. 5, 2014.

* cited by examiner

| INTERRUPT TYPE | OCCURRENCE TIME |
|---|---|
| DEVICE READING | T_a |
| KEYBOARD INPUT | T_b |

(310)

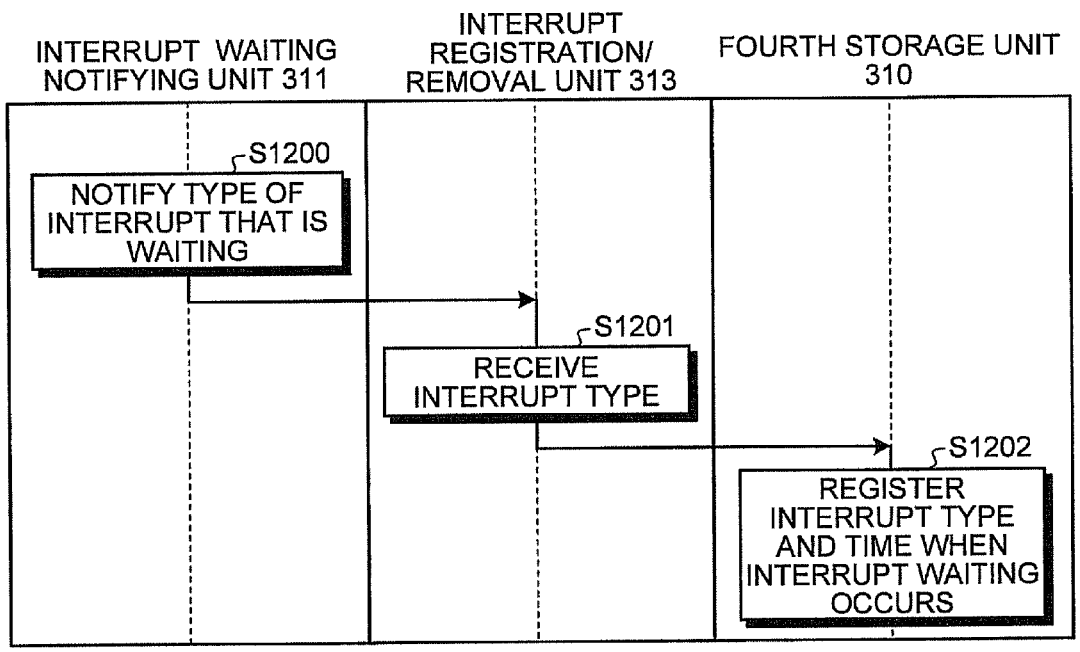

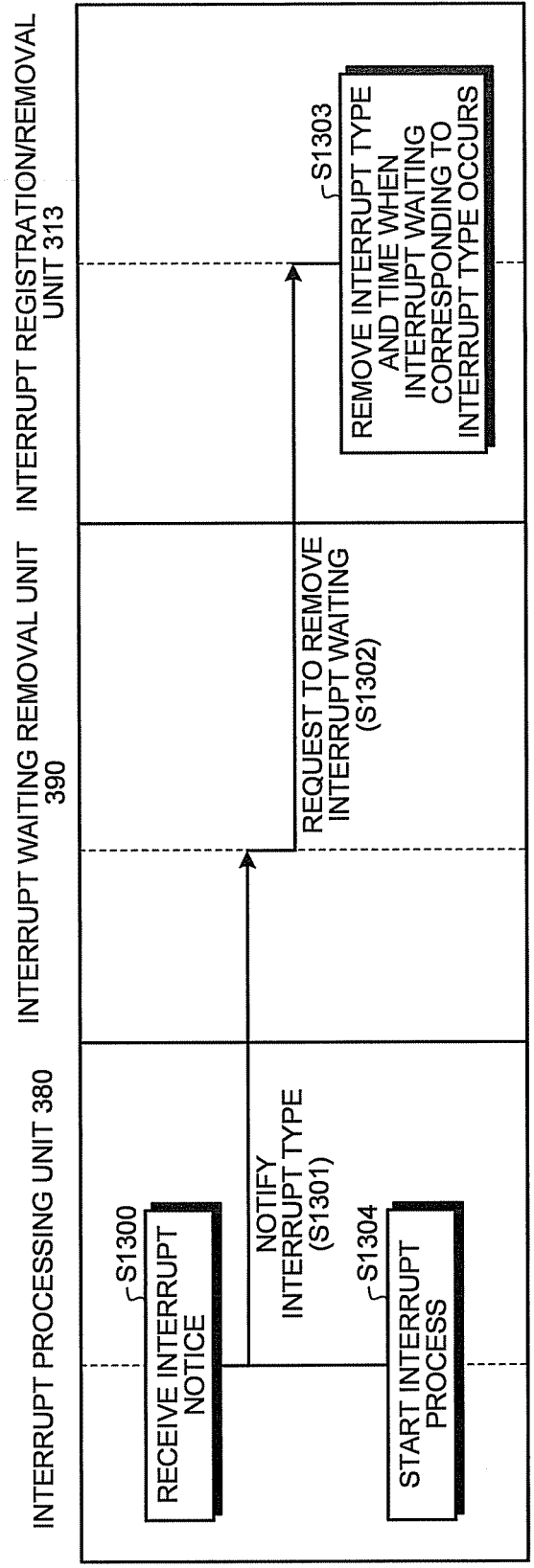

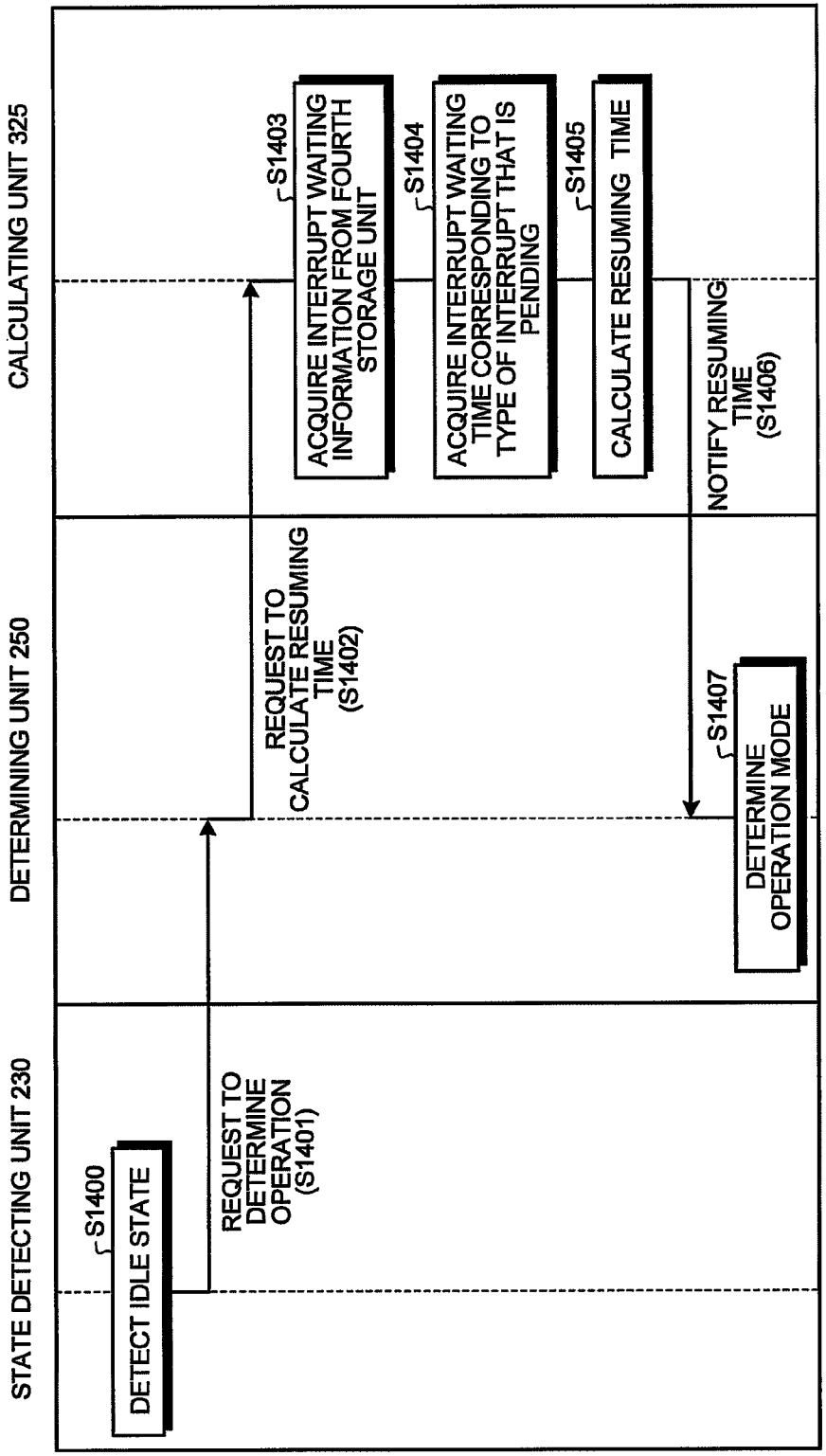

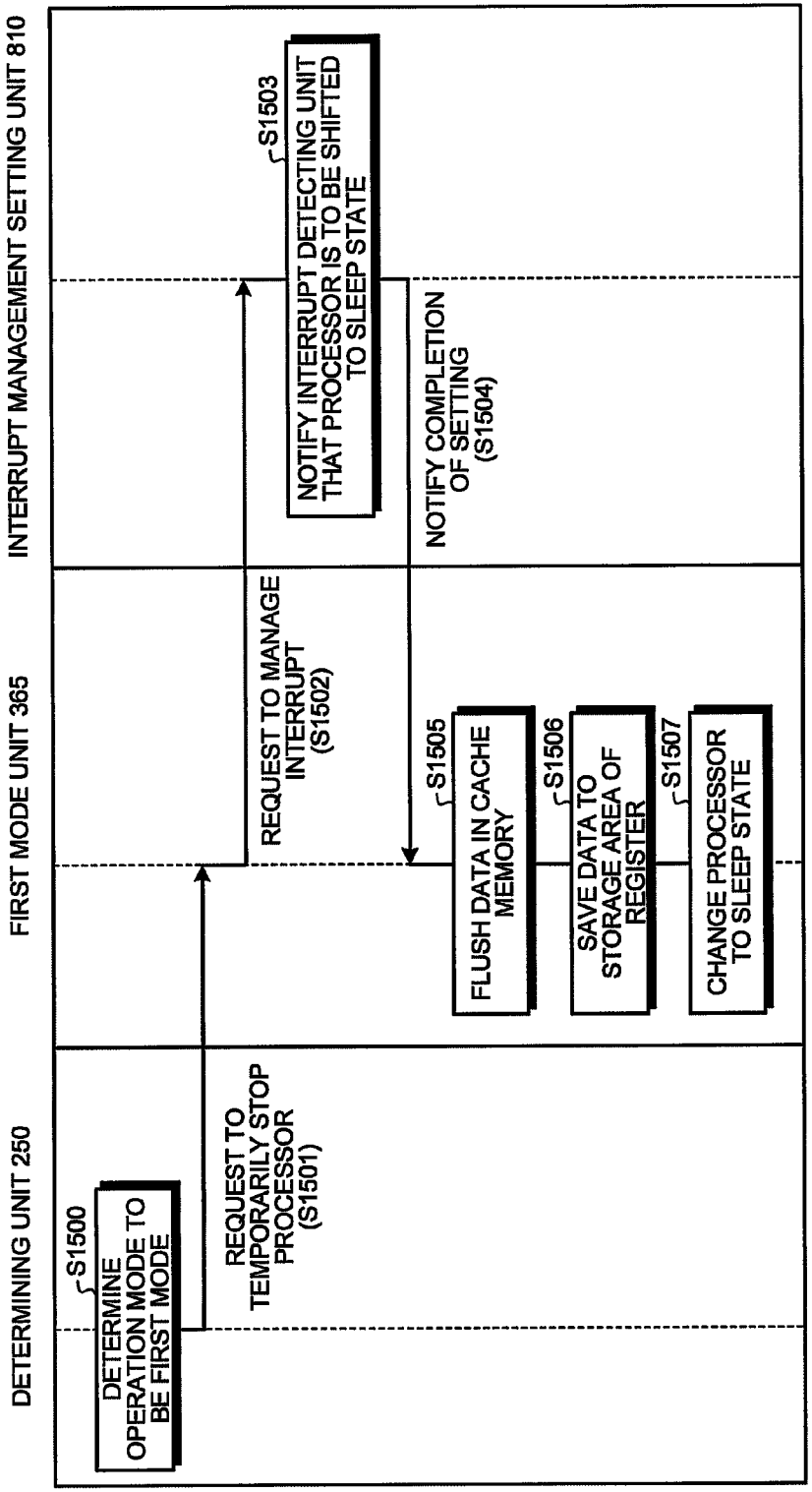

CONTROLLER AND PROGRAM PRODUCT

CROSS-REFERENCE TO RELATED APPLICATION

This application is based upon and claims the benefit of priority from Japanese Patent Application No. 2011-065704, filed on Mar. 24, 2011; the entire contents of which are incorporated herein by reference.

FIELD

Embodiments described herein relate generally to a controller and a program product.

BACKGROUND

Conventionally, techniques have been proposed which reduce the power consumption of a processing device (for example, a microprocessor) capable of performing one or more processes. For example, there are the following techniques: a dynamic voltage frequency scaling (DVFS) technique that reduces a power supply voltage or a frequency to reduce the power consumption; and a power gating technique that supplies power only to a portion requiring power.

As an example of the power gating technique, there is a technique that divides a processor into a plurality of clock domains and determines whether to supply power to each clock domain. In addition, there is a fine grain power gating technique that determines whether to supply power to each computing unit in a processor.

As another method of reducing the power consumption of a microprocessor, there is a technique that temporarily stops the entire processor to be shifted to a power saving state (sleep state).

BRIEF DESCRIPTION OF THE DRAWINGS

FIG. 10 is a diagram illustrating an example of information stored in a fifth storage unit;

FIG. 11 is a sequence diagram illustrating the operation of the target system according to the second embodiment;

FIG. 12 is a sequence diagram illustrating the operation of the target system according to the second embodiment;

FIG. 13 is a sequence diagram illustrating the operation of the target system according to the second embodiment;

FIG. 14 is a sequence diagram illustrating the operation of the target system according to the second embodiment;

DETAILED DESCRIPTION

In general, according to one embodiment, a controller includes a state detecting unit, a calculating unit, and a determining unit. The state detecting unit detects an idle state in which indicates there are no processes that can execute on a processing device capable of performing one or more processes. The calculating unit calculates a resuming time, which indicates a time length until a next process starts, when the state detecting unit detects the idle state. The determining unit determines an operation mode of the processing device on the basis of the resuming time calculated by the calculating unit.

First Embodiment

Figure 1:
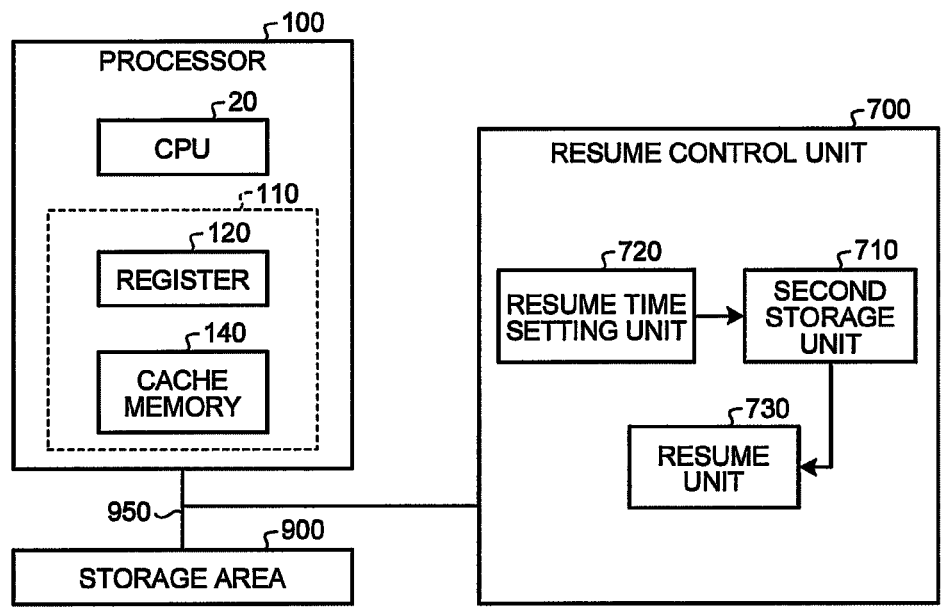
FIG. 1 is a block diagram illustrating a target system according to a first embodiment.

FIG. 1 is a block diagram illustrating an example of the schematic structure of a target system according to a first embodiment. As shown in FIG. 1, the target system includes a processor 100, a resume control unit 700, and a storage area 900 which are connected to each other by a bus 950. The processor 100 is a processing device that can execute one or more processes. As shown in FIG. 1, the processor 100 includes a CPU 20 and a third storage unit 110. Specifically, the third storage unit 110 includes a register 120 that stores various kinds of data and a cache memory 140 that stores, for example, frequently-used data. In this embodiment, each of the register 120 and the cache memory 140 is a volatile memory.

The resume control unit 700 is for resuming the operation of the processor 100 which is in a power saving state (sleep state), which will be described later. As shown in FIG. 1, the resume control unit 700 includes a second storage unit 710, a resume time setting unit 720, and a resume unit 730. The second storage unit 710 stores resuming time, indicating a time which the processor should be resumed by timer interrupt. The resume time setting unit 720 sets the resuming time notified by the processor 100 to the second storage unit 710. When it is detected that the time reaches the resuming time stored in the second storage unit 710, the resume unit 730 resumes the operation of the processor 100. The above-mentioned operation will be described in detail later.

When power is turned off and then turned on, the storage area 900 is capable of recovering internal data. For example, as the storage area capable of recovering internal data, there is a non-volatile memory and the storage area may be a magnetic random access memory (MRAM) or a ferroelectric random access memory (FeRAM). The storage area is not limited to the non-volatile memory. The storage area may be a general dynamic random access memory (DRAM) having a mechanism that recoveries internal data when power is turned on.

Figure 2:
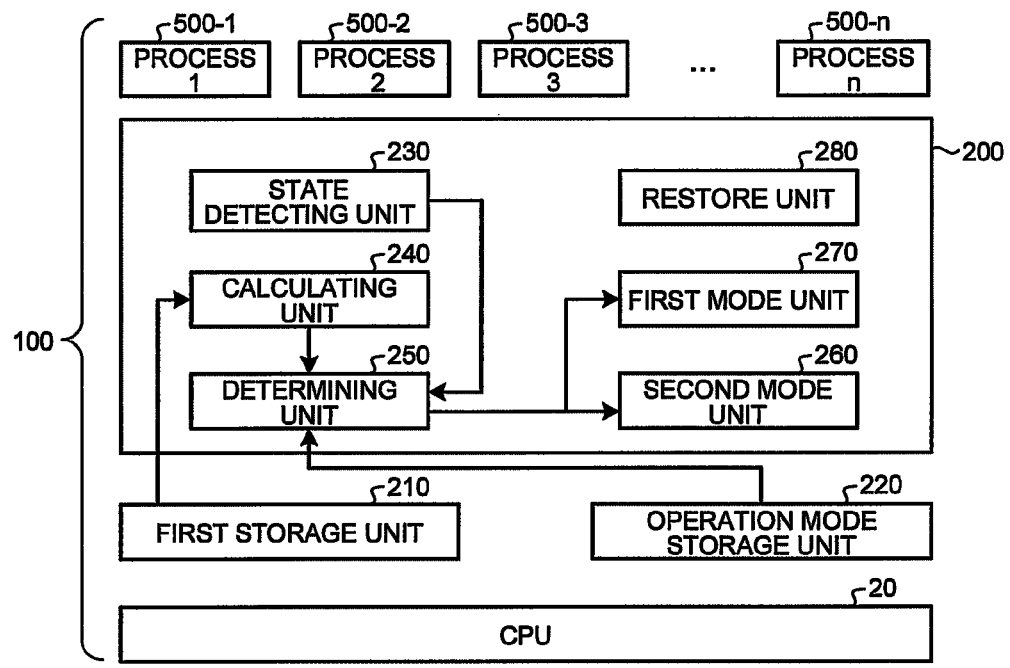
FIG. 2 is a block diagram illustrating a processor according to the first embodiment.

FIG. 2 is a block diagram illustrating the structure of functions implemented by the CPU 20 provided in the processor 100 to execute an operating system (OS) 200, which is basic software, and hardware components of the processor 100. In this embodiment, it is assumed that a single OS 200 is operated on the processor 100 and one or more processes (500-1 to 500-n) are operated on the OS 200. FIG. 2 represents that the processor 100 includes the hardware components, the OS 200 operated on the processor 100, and one or more processes operated on the OS 200.

As shown in FIG. 2, the hardware components of the processor 100 includes the CPU 20, a first storage unit 210, and an operation mode storage unit 220. The first storage unit 210 stores therein timer information. The timer information includes set time and a process which is performed at the set time. The operation mode storage unit 220 stores therein the relation between resuming time, indicating a time which the processor should be resumed by timer interrupt, and the operation mode to be set. This will be described in detail later.

As shown in FIG. 2, the OS 200 includes a state detecting unit 230, a calculating unit 240, a determining unit 250, a second mode unit 260, a first mode unit 270, and a restore unit 280. The state detecting unit 230 can detect an idle state. The idle state means a state in which the processor 100 performs no process.

When the state detecting unit 230 detects the idle state, the calculating unit 240 calculates the resuming time indicating a time length until the next process starts, using the timer information stored in the first storage unit 210. Specifically, the calculating unit 240 calculates the time when the next process starts from the timer information stored in the first storage unit 210 and calculates, as the resuming time, the time length of the difference between the calculated time and the current time.

Figure 3:
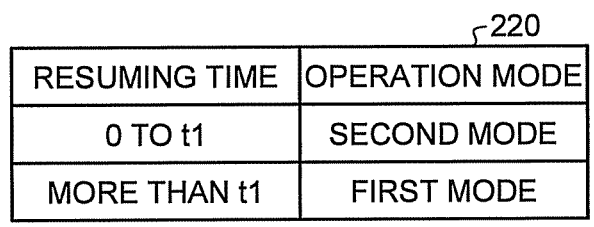
FIG. 3 is a diagram illustrating an example of information stored in an operation mode storage unit.

The determining unit 250 acquires the resuming time from the calculating unit 240 and determines the operation mode of the processor 100 on the basis of the acquired resuming time. Specifically, the determining unit 250 determines the operation mode of the processor 100 on the basis of the resuming time acquired from the calculating unit 240 and the data stored in the operation mode storage unit 220. This will be described in detail below. FIG. 3 is a diagram illustrating an example of information stored in the operation mode storage unit 220. As shown in FIG. 3, the operation mode storage unit 220 stores therein the relation between the resuming time and the operation mode to be set. When the resuming time is more than t1, the determining unit 250 determines the operation mode of the processor 100 to be a first mode in which the operation of the processor is temporarily stopped and the processor becomes a power saving state (sleep state). On the other hand, when the resuming time is equal to or less than t1, the determining unit 250 determines the operation mode of the processor 100 to be a second mode in which the processor 100 is still in the idle state.

When the operation mode of the processor 100 is in the second mode, the second mode unit 260 performs the processor 100 is still in the idle state (referred to as an idle task). When the determining unit 250 determines the operation mode of the processor 100 to be the first mode, the first mode unit 270 saves the data stored in the register 120 and the cache memory 140 to the storage area 900 and temporarily stops the operation of the processor 100 such that the processor 100 becomes the power saving state (sleep state). When the operation of the processor 100 in the sleep state resumes, the restore unit 280 restores the data saved in the storage area 900 to the register 120, which will be described in detail later.

Figure 4:
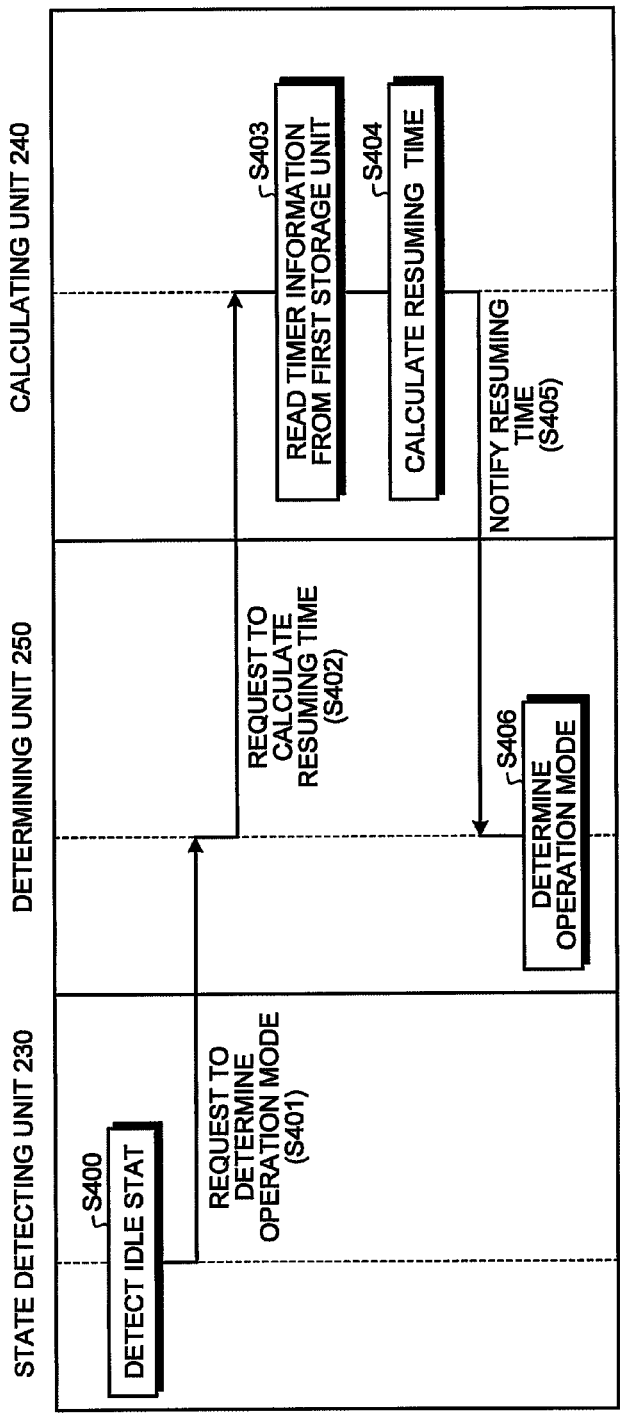
FIG. 4 is a sequence diagram illustrating the operation of the target system according to the first embodiment.

FIG. 4 is a sequence diagram illustrating an example of a process from the detection of the idle state of the processor 100 to the determination of the operation mode of the processor 100. As shown in FIG. 4, first, the state detecting unit 230 detects the idle state of the processor 100 (Step S400) and requests the determining unit 250 to determine the operation mode (Step S401). Then, the determining unit 250 requests the calculating unit 240 to calculate the resuming time (Step S402).

Then, the calculating unit 240 reads the timer information stored in the first storage unit 210 (Step S403). Then, the calculating unit 240 extracts the time when the next process is performed from the read timer information and calculates, as the resuming time, the time length of the difference between the extracted time and the current time (Step S404). Then, the calculating unit 240 notifies the calculated resuming time to the determining unit 250 (Step S405).

Then, the determining unit 250 determines the operation mode on the basis of the resuming time acquired from the calculating unit 240 and the data stored in the operation mode storage unit 220 (Step S406).

Figure 5:
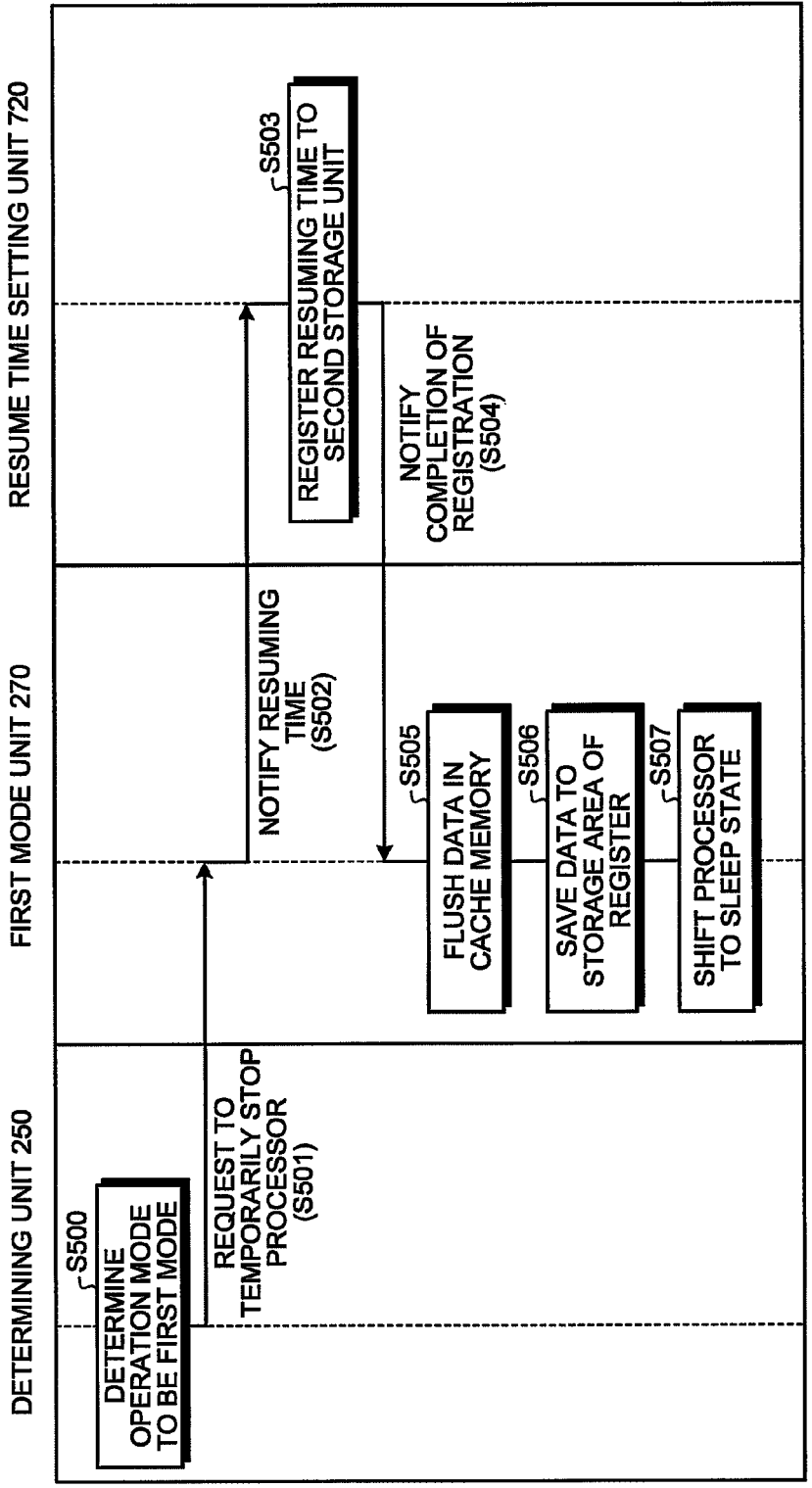
FIG. 5 is a sequence diagram illustrating the operation of the target system according to the first embodiment.

FIG. 5 is a sequence diagram illustrating an example of a process until the processor 100 becomes the sleep state after the operation mode of the processor 100 is determined to be the first mode. As shown in FIG. 5, when the operation mode of the processor 100 is determined to be the first mode (Step S500), the determining unit 250 requests the first mode unit 270 to temporarily stop the operation of the processor 100 (Step S501). In this embodiment, the determining unit 250 requests to temporarily stop the operation of the processor 100 and notifies the resuming time acquired from the calculating unit 240 to the first mode unit 270.

Then, the first mode unit 270 notifies the resuming time notified by the determining unit 250 to the resume time setting unit 720 (Step S502). Then, the resume time setting unit 720 registers the resuming time notified by the first mode unit 270 to the second storage unit 710 (Step S503). Then, the resume time setting unit 720 notifies the first mode unit 270 that the registration of the resuming time has been completed (Step S504).

Then, the first mode unit 270 flushes the data stored in the cache memory 140 to the storage area 900 (Step S505). The flushed (transmitted) data is written to the storage area 900. Then, the first mode unit 270 saves the data stored in the register 120 to the storage area 900 (Step S506). Then, the first mode unit 270 temporarily stops the operation of the processor 100 and shifts the state of the processor 100 to the power saving state (sleep state) (Step S507).

Figure 6:
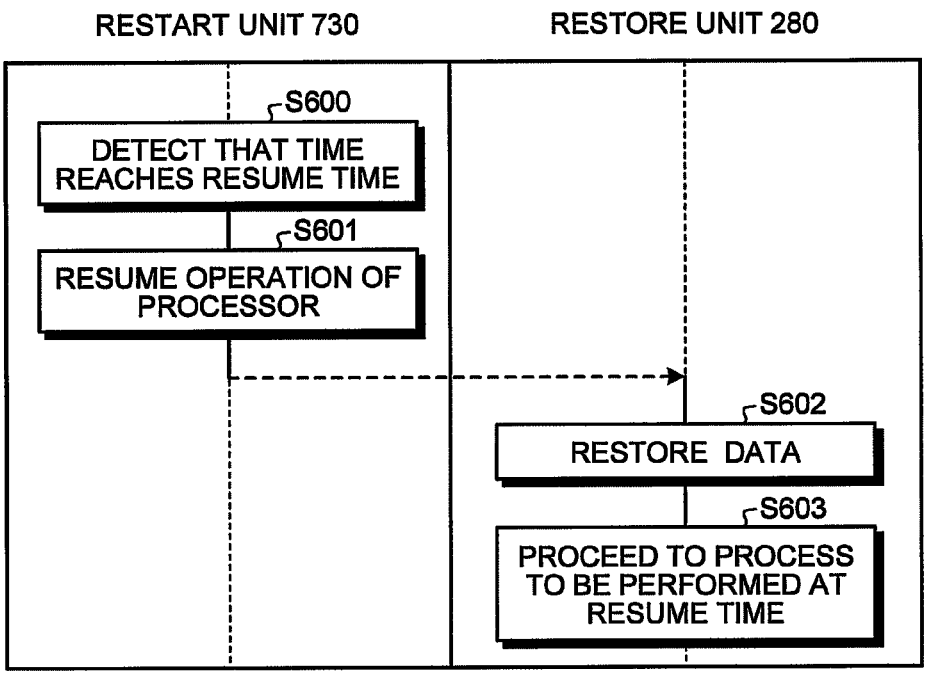
FIG. 6 is a sequence diagram illustrating the operation of the target system according to the first embodiment.

FIG. 6 is a sequence diagram illustrating an example of a process until the time reaches the resume time and the operation of the processor 100 resumes. As shown in FIG. 6, when it is detected that the time reaches the resume time (Step S600), the resume unit 730 resumes the operation of the processor 100 to cancel the first mode (Step S601).

Then, the restore unit 280 restores the data which is saved to the storage area 900 by the first mode unit 270 to the register 120 (Step S602). Then, the process proceeds to a step which will be performed at the resume time (Step S603).

As described above, in this embodiment, the operation mode of the processor 100 is determined on the basis of the resuming time calculated from the timer information. Specifically, when the resuming time is more than a predetermined time length (t1), the processor 100 becomes the sleep state. When the resuming time is equal to or less than the predetermined time length, the processor 100 is maintained in the idle state. Therefore, it is possible to effectively reduce the power consumption of the processor 100.

A method of shifting the processor 100 to the sleep state to reduce the power consumption can reduce the power consumption of the processor 100. However, in this method, a large overhead occurs due to, for example, a process for temporarily stopping the operation of the processor 100 and power consumption caused by the process (for example, the saving or restoring of data to the register and the flushing of data in the cache memory) or the influence of the process (for example, an increase in the number of memory accesses due to the flushing of data in the cache memory) is not negligible. Therefore, in some cases, power consumption when the processor 100 is shifted to the sleep state is more than that which can be reduced by shifting the processor 100 to the sleep state, depending on the value of the time length (resuming time) from a shift in the state of the processor 100 to the idle state and the execution of the next process.

In this embodiment, only when the resuming time is more than a predetermined time length, the processor 100 is shifted to the sleep state. Therefore, it is possible to effectively reduce power consumption. In this embodiment, only the processor 100 may be construed as a controller, which switches the operation mode of the processor 100, or the processor 100 and the resume control unit 700 may be construed as the controller.

Second Embodiment

A second embodiment is different from the first embodiment in that the time length from a shift in the state of the processor 100 to the idle state to the time in which the next interrupt is occurred is calculated as the resuming time. This will be described in detail below. The same components as those in the first embodiment are denoted by the same reference numerals and a description thereof will not be repeated.

Figure 7:
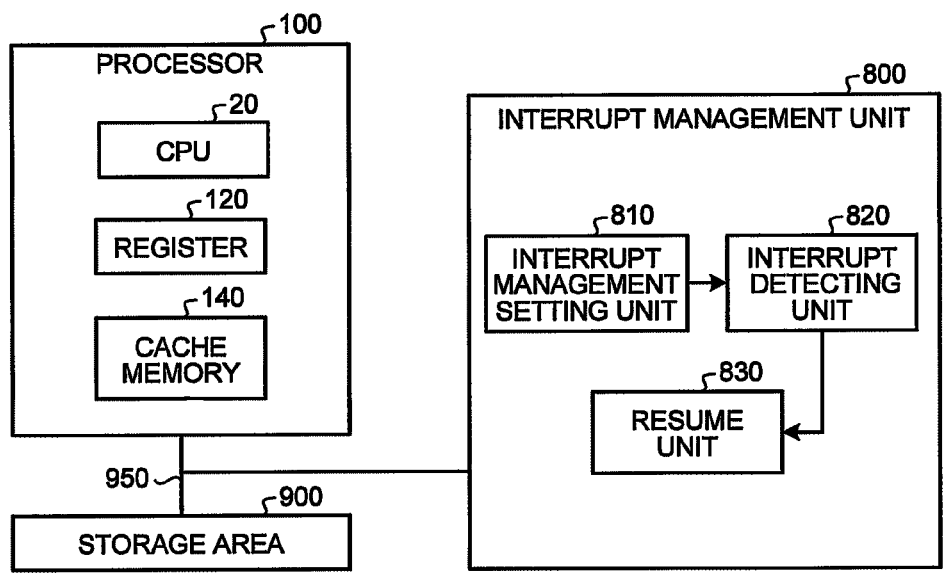
FIG. 7 is a block diagram illustrating a target system according to a second embodiment.

FIG. 7 is a block diagram illustrating an example of the schematic structure of a target system according to this embodiment. As shown in FIG. 7, the target system includes a processor 100, an interrupt management unit 800, and a storage area 900 which are connected to each other by a bus 950. The interrupt management unit 800 manages interrupts in substitute for the processor 100 when the processor 100 is in the power saving state (sleep state). As shown in FIG. 7, the interrupt management unit 800 includes an interrupt management setting unit 810, an interrupt detecting unit 820, and a resume unit 830.

When the determining unit 250 determines the operation mode of the processor 100 to be the first mode, the interrupt management setting unit 810 notifies the interrupt detecting unit 820 that the processor 100 is to be shifted to the sleep state. The interrupt detecting unit 820 detects whether an interrupt occurs. When the interrupt detecting unit 820 detects the occurrence of an interrupt, the resume unit 830 resumes the operation of the processor 100 in the sleep state. When the interrupt is detected and the processor 100 is in the sleep state, the interrupt detecting unit 820 transmits a resume request, which will be described later, to the resume unit 830. When receiving the resume request from the interrupt detecting unit 820, the resume unit 830 resumes the operation of the processor 100 in the sleep state.

Figures 8, 9:
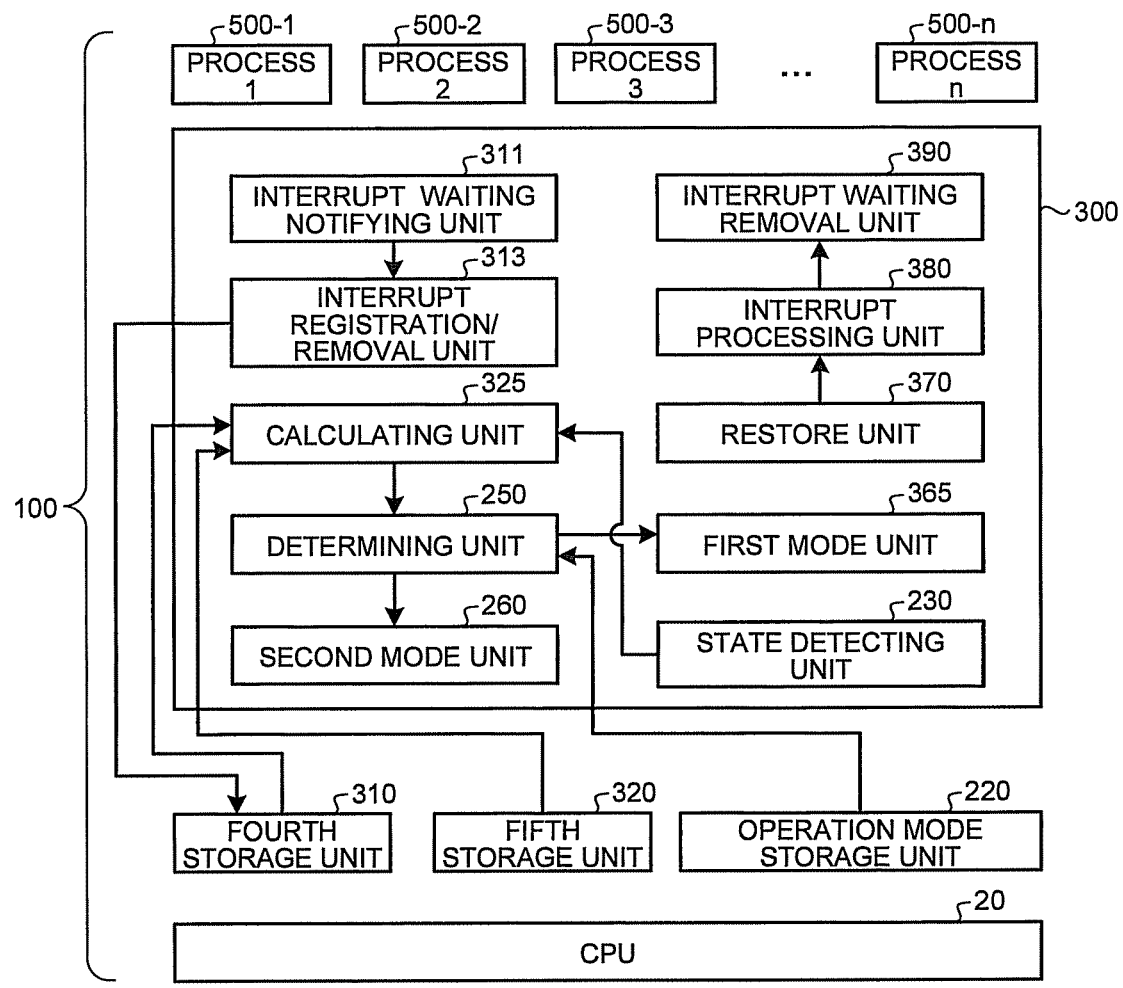
FIG. 8 is a block diagram illustrating a processor according to the second embodiment.
FIG. 9 is a diagram illustrating an example of information stored in a fourth storage unit.

FIG. 8 is a block diagram illustrating the structure of functions implemented by a CPU 20 provided in the processor 100 to execute an OS 300 and hardware components of the processor 100. As shown in FIG. 8, the hardware components of the processor 100 include the CPU 20, a fourth storage unit 310, a fifth storage unit 320, and an operation mode storage unit 220. FIG. 8 represents that the processor 100 includes the hardware components, the OS 300 operated on the processor 100, and one or more processes operated on the OS 300.

The fourth storage unit 310 stores therein interrupt waiting information. The interrupt waiting information includes an interrupt type indicating the type of interrupt process and the time when interrupt waiting corresponding to the interrupt type occurs. FIG. 9 is a diagram illustrating an example of the interrupt waiting information stored in the fourth storage unit 310. In the example shown in FIG. 9, there are two types of interrupts, that is, device reading and keyboard input. In addition, the time when the interrupt waiting of the "device reading" occurs is T_a and the time when the interrupt waiting of the "keyboard input" is T_b.

The fifth storage unit 320 shown in FIG. 8 stores therein an interrupt type and an interrupt resuming time corresponding to the interrupt type. The interrupt waiting time corresponding to each interrupt type is a predicted value which is calculated in advanced. FIG. 10 is a diagram illustrating an example of the information stored in the fifth storage unit 320. In the example shown in FIG. 10, the interrupt waiting time corresponding to the device reading is set to T3. In addition, the interrupt waiting time corresponding to the keyboard input is set to T4. The interrupt waiting time corresponding to a mouse input is set to T5.

As shown in FIG. 8, the OS 300 includes an interrupt waiting notifying unit 311, a interrupt registration/removal unit 313, a calculating unit 325, a determining unit 250, a second mode unit 260, a state detecting unit 230, a first mode unit 365, a restore unit 370, an interrupt processing unit 380, and an interrupt waiting removal unit 390. When interrupt waiting occurs, the interrupt waiting notifying unit 311 notifies the type of interrupt, which is waiting, to the interrupt registration/removal unit 313. The interrupt registration/removal unit 313 registers the interrupt type notified by the interrupt waiting notifying unit 311 and the time when the interrupt waiting corresponding to the interrupt type occurs to the fourth storage unit 310. When an interrupt process starts, the interrupt registration/removal unit 313 removes the type of interrupt which occurs and the time when the interrupt waiting corresponding to the interrupt type occurs from the fourth storage unit 310, which will be described in detail later.

When the state detecting unit 230 detects the idle state, the calculating unit 325 calculates the time length from the current time to the time when the next interrupt process starts as the resuming time on the basis of the interrupt waiting information stored in the fourth storage unit 310 and the information stored in the fifth storage unit 320, which will be described in detail later.

When the determining unit 250 determines the operation mode of the processor 100 to be the first mode, the first mode unit 365 saves the data stored in the register 120 and the cache memory 140 to the storage area 900 and temporarily stops the operation of the processor 100 such that the processor 100 becomes the power saving state (sleep state). When the processor 100 in the sleep state resumes its operation, the restore unit 370 restores the data saved in the storage area 900 to the register 120.

When receiving an interrupt notice indicating the occurrence of the interrupt process from the interrupt management unit 800, the interrupt processing unit 380 starts the interrupt process. When receiving the interrupt notice from the interrupt management unit 800, the interrupt processing unit 380 notifies the interrupt type specified by the interrupt notice to the interrupt waiting removal unit 390. The interrupt waiting removal unit 390 transmits a request to remove the interrupt waiting corresponding to the interrupt type notified by the interrupt processing unit 380 to the interrupt registration/removal unit 313.

FIG. 11 is a sequence diagram illustrating an example of the operation of the processor 100 when interrupt waiting occurs. In this embodiment, when a device is in an interrupt waiting state, information indicating that interrupt waiting occurs in the device is transmitted from, for example, a device driver to the interrupt waiting notifying unit 311. As shown in FIG. 11, when interrupt waiting occurs, the interrupt waiting notifying unit 311 notifies the type of interrupt, which is waiting, to the interrupt registration/removal unit 313 (Step S1200). When receiving the interrupt type notified by the interrupt waiting notifying unit 311 (Step S1201), the interrupt registration/removal unit 313 registers the received interrupt type and the time when the interrupt waiting corresponding to the interrupt type occurs to the fourth storage unit 310 (Step S1202).

FIG. 12 is a sequence diagram illustrating an example of the operation of the processor 100 when an interrupt process occurs. As shown in FIG. 12, when receiving the interrupt notice from the interrupt management unit 800 (Step S1300), the interrupt processing unit 380 transmits the interrupt type specified by the interrupt notice to the interrupt waiting removal unit 390 (Step S1301) and starts the interrupt process specified by the interrupt notice (Step S1304).

The interrupt waiting removal unit 390 transmits an interrupt waiting removal request to remove the interrupt waiting corresponding to the interrupt type notified by the interrupt processing unit 380 to the interrupt registration/removal unit 313 (Step S1302). The interrupt registration/removal unit 313 removes the interrupt type corresponding to the interrupt waiting removal request from the interrupt waiting removal unit 390 and the time when the interrupt waiting corresponding to the interrupt type occurs from the fourth storage unit 310 (Step S1303). As described above, when interrupt waiting occurs, the type of interrupt, which is waiting, and the time when the interrupt waiting occurs are registered to the fourth storage unit 310. When the interrupt waiting is cancelled, the type of interrupt which occurs and the time when the interrupt waiting occurs are removed from the fourth storage unit 310. Thus, it is possible to appropriately manage the current interrupt waiting state.

FIG. 13 is a sequence diagram illustrating an example of a process until the operation mode of the processor 100 is determined after the idle state of the processor 100 is detected. As shown in FIG. 13, first, the state detecting unit 230 detects the idle state of the processor 100 (Step S1400) and requests the determining unit 250 to determine the operation mode (Step S1401). Then, the determining unit 250 requests the calculating unit 325 to calculate the resuming time indicating a time length until the next interrupt process occurs (Step S1402).

Then, the calculating unit 325 acquires the interrupt waiting information stored in the fourth storage unit 310 (Step S1403). Then, the calculating unit 325 acquires the interrupt resuming time corresponding to the type of interrupt that is currently waiting from the fifth storage unit 320 (Step S1404). Then, the calculating unit 325 calculates the resuming time from the interrupt waiting information acquired from the fourth storage unit 310 and the interrupt waiting time acquired from the fifth storage unit 320 (Step S1405).

Next, an example of a method of calculating the resuming time in the calculating unit 325 will be described. For example, it is assumed that interrupts "device reading" and "keyboard input" are waiting, the time T_b when the interrupt waiting of the keyboard input occurs is earlier than the time T_a when the interrupt waiting of the device reading occurs, and an interrupt waiting time T4 corresponding to the keyboard input is less than an interrupt waiting time T3 corresponding to the device reading. In this case, since the keyboard input is performed earlier than the device reading, the next interrupt process is the keyboard input and the keyboard input is performed after the time length T4 has elapsed from the time T_b. In this way, it is possible to specify the time when the keyboard input, which is the next interrupt process, starts. Therefore, the calculating unit 325 calculates, as the resuming time, the time length from the current time to the time when the keyboard input starts. Then, the calculating unit 325 notifies the calculated resuming time to the determining unit 250 (Step S1406).

Then, the determining unit 250 determines the operation mode on the basis of the resuming time acquired from the calculating unit 325 and the data stored in the operation mode storage unit 220 (Step S1407). A method of determining the operation mode is the same as that in the first embodiment.

FIG. 14 is a sequence diagram illustrating an example of a process until the processor 100 becomes the sleep state after the operation mode of the processor 100 is determined to be the first mode. As shown in FIG. 14, when the operation mode of the processor 100 is determined to be the first mode (Step S1500), the determining unit 250 requests the first mode unit 365 to temporarily stop the operation of the processor 100 (Step S1501).

Then, the first mode unit 365 requests the interrupt management setting unit 810 to manage interrupts (Step S1502). The interrupt management setting unit 810 receiving the interrupt management request notifies the interrupt detecting unit 820 that the processor 100 is to be shifted to the sleep state (Step S1503). Then, the interrupt management setting unit 810 notifies the first mode unit 365 that settings have been completed (Step S1504).

Then, the first mode unit 365 flushes the data stored in the cache memory 140 to the storage area 900 (Step S1505). The flushed data is written to the storage area 900. Then, the first mode unit 365 saves the data stored in the register 120 to the storage area 900 (Step S1506). Then, the first mode unit 365 shifts the state of the processor 100 to the sleep state (Step S1507).

Figure 15:
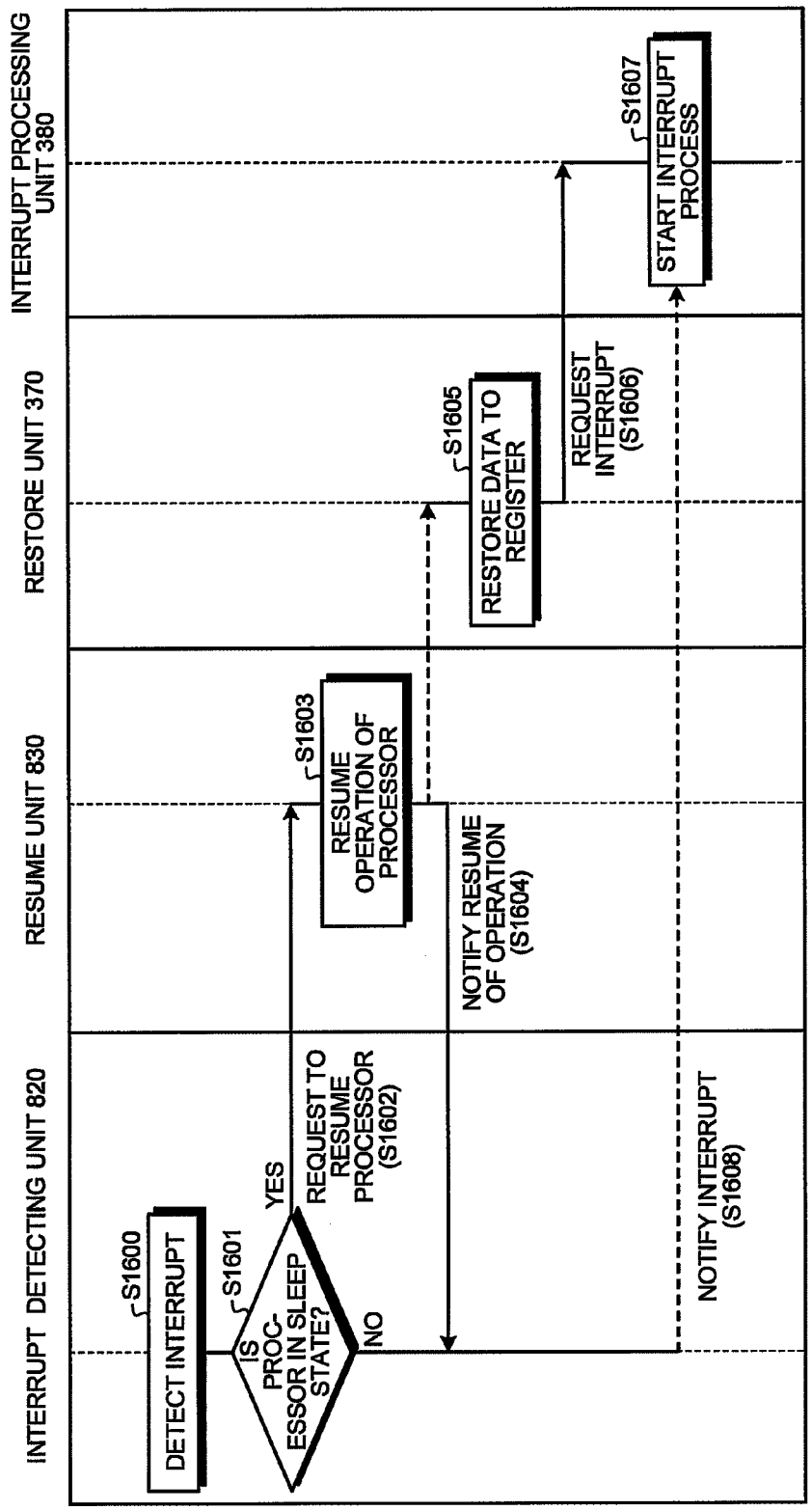
FIG. 15 is a sequence diagram illustrating the operation of the target system according to the second embodiment.

FIG. 15 is a sequence diagram illustrating an example of a process until the interrupt process starts after an interrupt is detected. As shown in FIG. 15, when an interrupt is detected (Step S1600), the interrupt detecting unit 820 determines whether the processor 100 is in the sleep state (Step S1601). For example, when receiving a notice indicating that the processor 100 is shifted to the sleep state from the interrupt management setting unit 810, the interrupt detecting unit 820 determines that the processor 100 is in the sleep state and transmits a resume request to resume the operation of the processor 100 to the resume unit 830 (Step S1602). On the other hand, when it is determined that the processor 100 is not in the sleep state, the interrupt detecting unit 820 transmits an interrupt notice to the interrupt processing unit 380 (Step S1608).

As shown in FIG. 15, when receiving the request to resume the operation of the processor 100 from the interrupt detecting unit 820, the resume unit 830 resumes the operation of the processor 100 and returns from the first mode (Step S1603). Then, the resume unit 830 notifies the interrupt detecting unit 820 that the operation of the processor 100 has resumed (Step S1604). When receiving the notice, the interrupt detecting unit 820 transmits the interrupt notice to the interrupt processing unit 380 (Step S1608).

When the operation of the processor 100 resumes, the restore unit 370 restores the data which is saved in the storage area 900 by the first mode unit 365 to the register 120 (Step S1605). Then, the restore unit 370 transmits an interrupt request to perform an interrupt to the interrupt processing unit 380 (Step S1606). When receiving the interrupt notice from the interrupt detecting unit 820, the interrupt processing unit 380 receiving the interrupt request starts the interrupt process specified by the interrupt notice (Step S1607).

As described above, in this embodiment, the time length from the time when the processor 100 becomes the idle state to the time when the earliest interrupt process (the next interrupt process) starts is calculated as the resuming time and the operation mode of the processor 100 is determined on the basis of the calculated resuming time. In this structure, similarly to the first embodiment, it is possible to effectively reduce the power consumption of the processor 100. In the above-described embodiment, only the processor 100 may be construed as the controller or the processor 100 and the interrupt management unit 800 may be construed as the controller.

Third Embodiment

In the second embodiment, the value of the interrupt waiting time stored in the fifth storage unit 320 is fixed. However, in a third embodiment, the value of the interrupt waiting time stored in the fifth storage unit 320 is variable, which will be described in detail below. The same components as those in the second embodiment are denoted by the same reference numerals and a description thereof will not be repeated.

Figure 16:
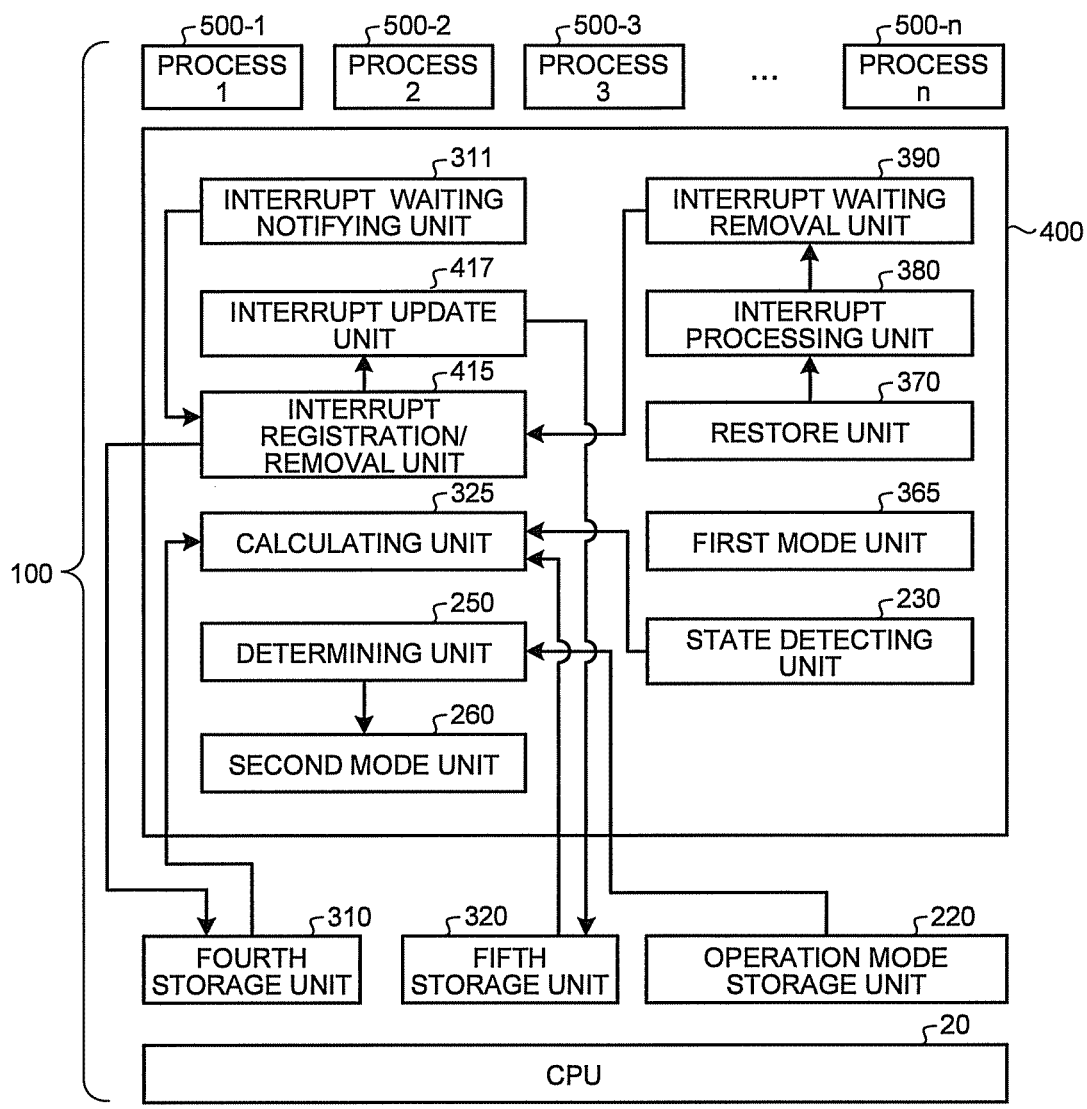
FIG. 16 is a block diagram illustrating a target system according to a third embodiment.

FIG. 16 is a block diagram illustrating the structure of functions which are implemented by a CPU 20 provided in a processor 100 to execute an OS 400 and hardware components of the processor 100. As shown in FIG. 16, the OS 400 includes an interrupt waiting notifying unit 311, an interrupt update unit 417, a interrupt registration/removal unit 415, a calculating unit 325, a determining unit 250, a second mode unit 260, a state detecting unit 230, a first mode unit 365, a restore unit 370, an interrupt processing unit 380, and an interrupt waiting removal unit 390. FIG. 16 represents that the processor 100 includes the hardware components, the OS 400 operated on the processor 100, and one or more processes operated on the OS 400.

When an interrupt waiting removal request is received from the interrupt waiting removal unit 390, the interrupt registration/removal unit 415 has a function of reading the time when the interrupt waiting of the interrupt type corresponding to the interrupt waiting removal request occurs from the fourth storage unit 310, in addition to the functions described in the second embodiment. Then, the interrupt registration/removal unit 415 notifies the read time and the interrupt type corresponding to the interrupt waiting removal request to the interrupt update unit 417.

The interrupt update unit 417 calculates the duration (interrupt waiting time) of the interrupt waiting from the time notified by the interrupt registration/removal unit 415 (the time when the interrupt waiting corresponding to the interrupt type notified by the interrupt registration/removal unit 415 occurs) and the current time (corresponding to the time when the interrupt process starts). Specifically, the interrupt update unit 417 calculates, as the interrupt waiting time, the time length of the difference between the time notified by the interrupt registration/removal unit 415 and the current time. Then, the interrupt update unit 417 updates the interrupt waiting time stored in the fifth storage unit 320 using the calculated interrupt waiting time. Specifically, the interrupt update unit 417 updates the value of the interrupt waiting time corresponding to the interrupt type notified by the interrupt registration/removal unit 415 among the interrupt waiting time values stored in the fifth storage unit 320 with the value of the calculated interrupt waiting time.

Figure 17:
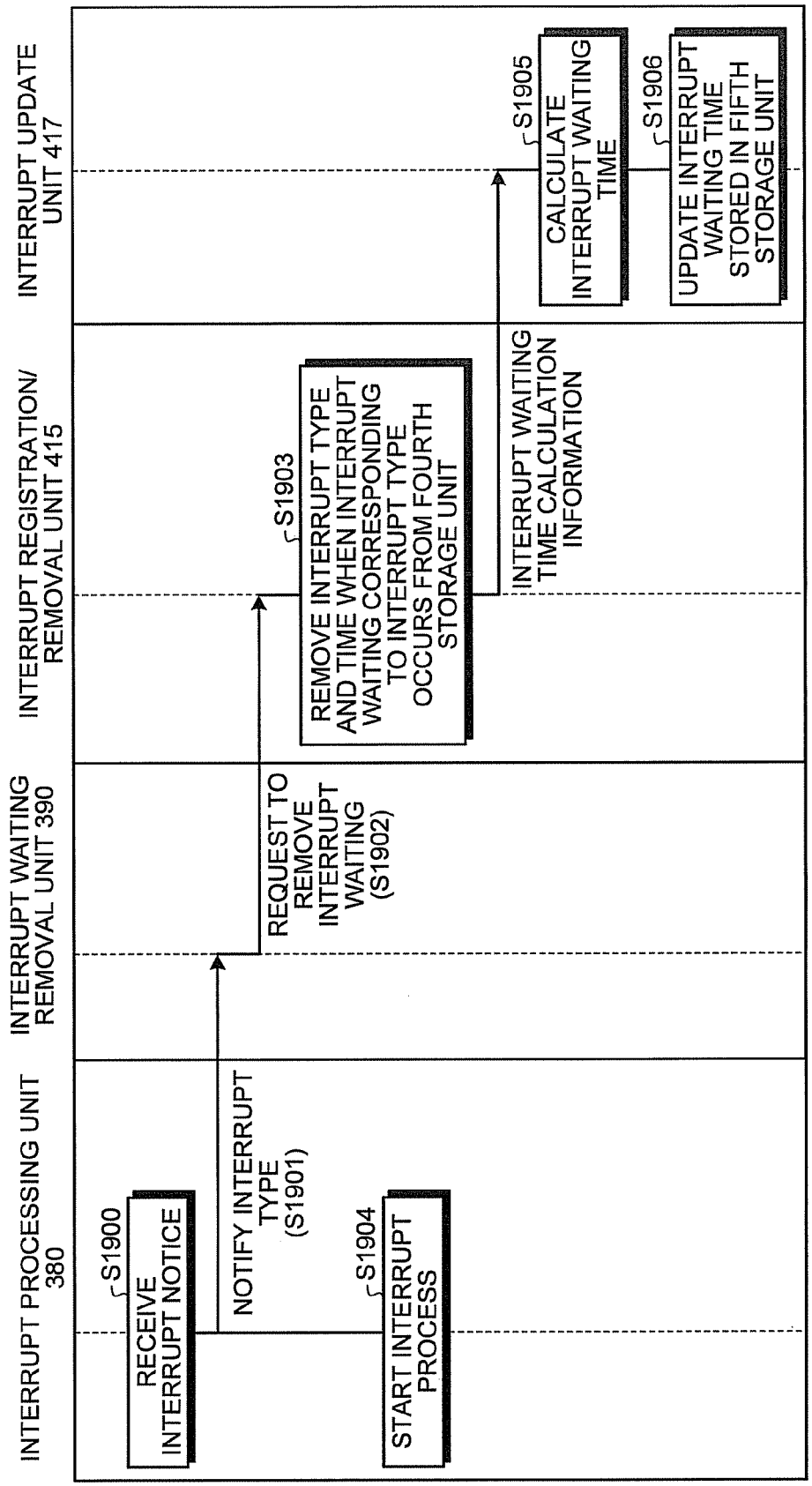
FIG. 17 is a sequence diagram illustrating the operation of the target system according to the third embodiment.

FIG. 17 is a sequence diagram illustrating an example of a process from the reception of the interrupt notice by the interrupt processing unit 380 to the update process of the interrupt update unit 417. As shown in FIG. 17, when receiving the interrupt notice from the interrupt management unit 800 (Step S1900), the interrupt processing unit 380 notifies the type of interrupt whose waiting is to be cancelled to the interrupt waiting removal unit 390 (Step S1901) and starts the interrupt process specified by the interrupt notice (Step S1904).

The interrupt waiting removal unit 390 transmits an interrupt waiting removal request to remove the interrupt waiting corresponding to the interrupt type notified by the interrupt processing unit 380 to the interrupt registration/removal unit 415 (Step S1902). Then, the interrupt registration/removal unit 415 removes the interrupt type corresponding to the interrupt waiting removal request from the interrupt waiting removal unit 390 and the time when the interrupt waiting corresponding to the interrupt type occurs from the fourth storage unit 310 (Step S1903). In addition, the interrupt registration/removal unit 415 transmits the interrupt type corresponding to the interrupt waiting removal request and the time when the interrupt waiting corresponding to the interrupt type occurs as interrupt waiting time calculation information which is used to calculate the interrupt waiting time to the interrupt update unit 417.

The interrupt update unit 417 calculates the interrupt waiting time on the basis of the interrupt waiting time information notified by the interrupt registration/removal unit 415 (Step S1905). A method of calculating the interrupt waiting time is the same as that described above and thus a detailed description thereof will not be repeated. Then, the interrupt update unit 417 updates the interrupt waiting time stored in the fifth storage unit 320 with the calculated interrupt waiting time (Step S1906). The update method is the same as that described above and thus a detailed description thereof will not be repeated.

As described above, in this embodiment, whenever the interrupt update unit 417 calculates the latest interrupt waiting time, the value of the interrupt waiting time stored in the fifth storage unit 320 is updated. Therefore, it is possible to approximate the value of the interrupt waiting time stored in the fifth storage unit 320 to the optimal value for the current target system.

Fourth Embodiment

In the first embodiment, the value of the resuming time indicating the shift conditions of the operation mode stored in the operation mode storage unit 220 is fixed. However, in a fourth embodiment, the resuming time stored in the operation mode storage unit 220 is variable, which will be described in detail below. The same components as those in the first embodiment are denoted by the same reference numerals and a description thereof will not be repeated.

Figure 18:
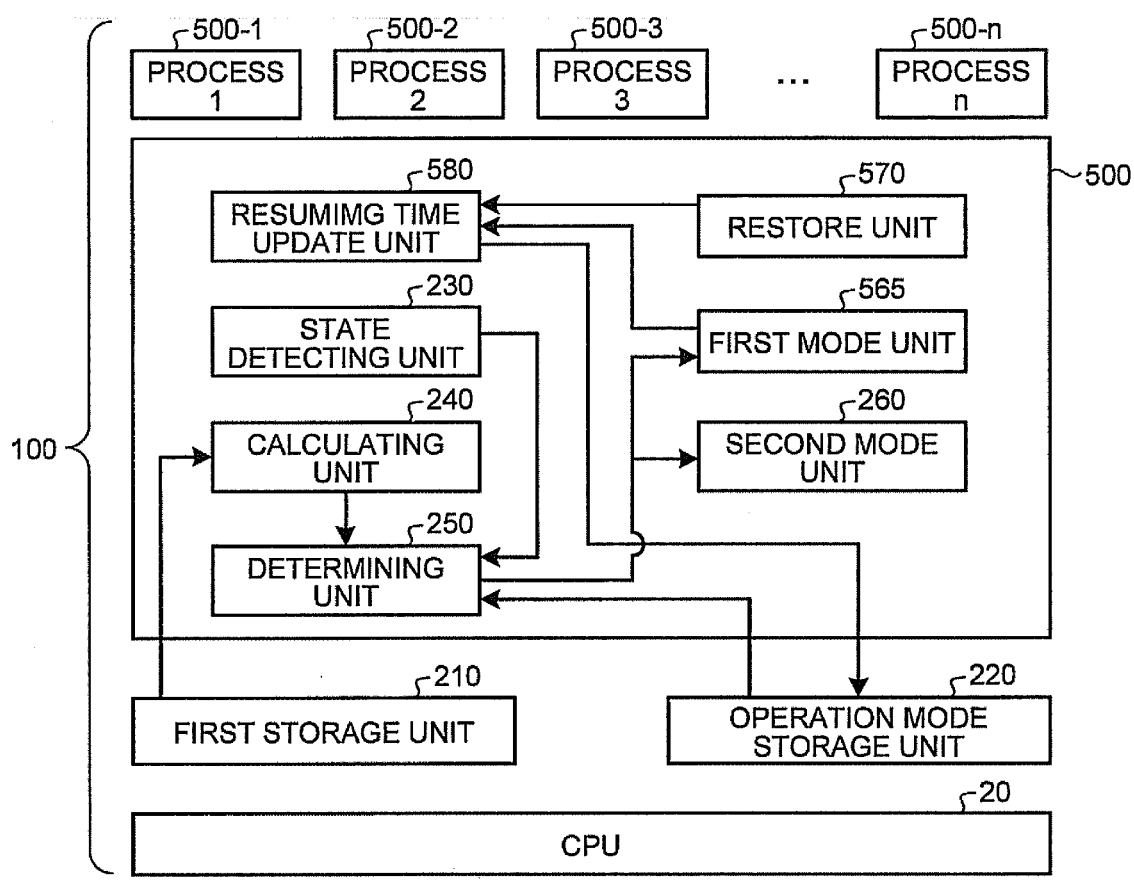
FIG. 18 is a block diagram illustrating a target system according to a fourth embodiment.

FIG. 18 is a block diagram illustrating the structure of functions implemented by a CPU 20 provided in a processor 100 to execute an OS 500 and hardware components of the processor 100. As shown in FIG. 18, the OS 500 includes a resuming time update unit 580, a state detecting unit 230, a calculating unit 240, a determining unit 250, a second mode unit 260, a first mode unit 565, and a restore unit 570. FIG. 18 represents that the processor 100 includes the hardware components, the OS 500 operated on the processor 100, and one or more processes operated on the OS 500.

The first mode unit 565 has a function of notifying the resuming time update unit 580 of a shift in the state of the processor 100 to the sleep state when a request to temporarily stop the operation of the processor 100 is received from the determining unit 250, in addition to the functions described in the first embodiment. The restore unit 570 has a function of notifying the resuming time update unit 580 of the resume of the operation of the processor 100 when the data saved in the storage area 900 by the first mode unit 565 is restored to the register 120, in addition to the functions described in the first embodiment.

The resuming time update unit 580 updates the value of the resuming time stored in the operation mode storage unit 220 according to characteristic information indicating the characteristics of the processor 100 during the period from the time when the processor 100 is shifted to the sleep state to the resume of the operation. In this embodiment, the power consumption of the processor 100 is used as the characteristic information. However, the embodiment is not limited thereto, and any kind of characteristic information may be used. For example, the temperature information of the processor 100 or the hit ratio of the cache may be used as the characteristic information. Any information necessary to change the resuming time stored in the operation mode storage unit 220 may be used as the characteristic information.

Figure 19:
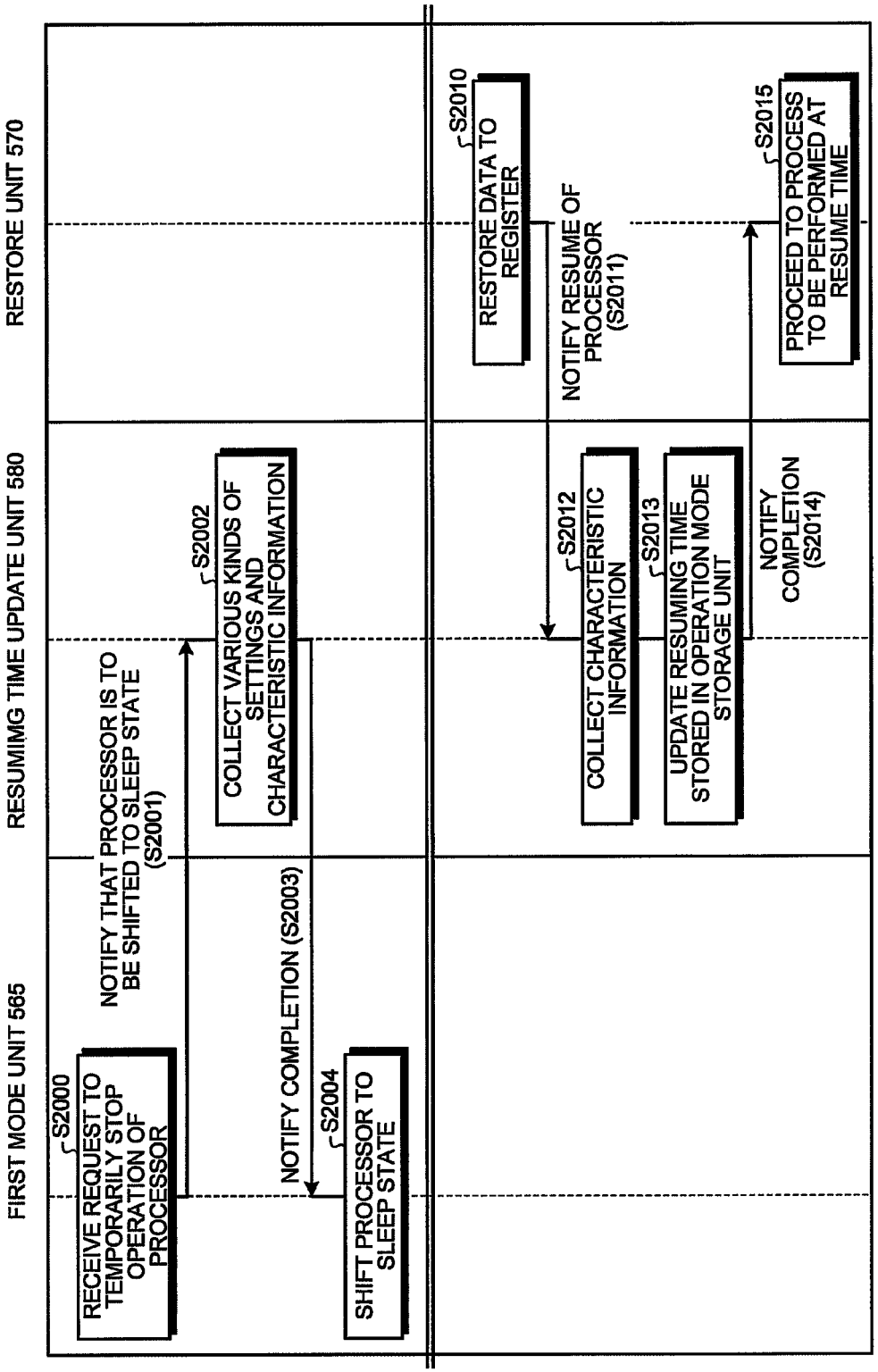
FIG. 19 is a sequence diagram illustrating the operation of the target system according to the fourth embodiment.

FIG. 19 is a sequence diagram illustrating an example of a process from the request of the temporary stop of the processor 100 to a change in the resuming time stored in the operation mode storage unit 220. As shown in FIG. 19, when a request to temporarily stop the operation of the processor 100 is received from the determining unit 250 (Step S2000), the first mode unit 565 notifies the resuming time update unit 580 that the processor 100 is to be shifted to the sleep state (Step S2001).

Then, the change unit 580 collects the characteristic information or various kinds of settings required to change the resuming time stored in the operation mode storage unit 220 (Step S2002). For example, the resuming time update unit 580 resets a measuring device that is capable of measuring the power consumption of the processor 100 for a specific period and directs the measuring device to measure the power consumption of the processor 100 from the time when the processor 100 is changed to the sleep state. Then, the resuming time update unit 580 notifies the first mode unit 565 that the correction of various kinds of settings and the characteristic information has been completed (Step S2003). When receiving the completion notice from the resuming time update unit 580, the first mode unit 565 temporarily stops the operation of the processor 100 and shifts the state of the processor 100 to a power saving state (sleep state) (Step S2004).

Then, as described above, when the time reaches the resume time and the resume unit 730 resumes the operation of the processor 100, the restore unit 570 restores the data, which is saved is the storage area 900 by the first mode unit 565, to the register 120 (Step S2010). Then, the restore unit 570 notifies the resuming time update unit 580 that the operation of the processor 100 has resumed (Step S2011).

When receiving the notice indicating that the operation of the processor 100 has resumed from the restore unit 570, the resuming time update unit 580 collects the characteristic information (Step S2012). For example, the resuming time update unit 580 can acquire power consumption for the period from the time when the processor 100 is shifted to the sleep state to the current time from the measuring device.

Then, the resuming time update unit 580 updates the resuming time stored in the operation mode storage unit 220 on the basis of the collected characteristic information (Step S2013). For example, if the resuming time is ty (>t1) and power consumption W2 when the processor 100 is maintained in the sleep state for the resuming time ty is significantly less than power consumption W1 when the processor 100 is maintained in the idle state for a resuming time t1, it is preferable that the value of the resuming time indicating the shift conditions of the operation mode be less than t1.

When a change in the resuming time stored in the operation mode storage unit 220 is completed, the resuming time update unit 580 notifies the restore unit 570 that the change in the resuming time has been completed (Step S2014). When receiving the completion notice from the resuming time update unit 580, the restore unit 570 proceeds to the process to be performed at the resume time (Step S2015).

As described above, in this embodiment, the value of the resuming time stored in the operation mode storage unit 220 is set so as to vary depending on the power consumption (an example of the characteristic information) of the processor 100 for the period from the time when the processor 100 is shifted to the sleep state to the resume time of the operation. Therefore, it is possible to approximate the value of the resuming time stored in the operation mode storage unit 220 to the optimal value for the current target system.

Fifth Embodiment

In the second embodiment, the value of the resuming time indicating the shift conditions of the operation mode which is stored in the operation mode storage unit 220 is fixed. In a fifth embodiment, similarly to the fourth embodiment, the value of the resuming time stored in the operation mode storage unit 220 is variable, which will be described in detail below. The same components as those in the second embodiment and the fourth embodiment are denoted by the same reference numerals and a description thereof will not be repeated.

Figure 20:
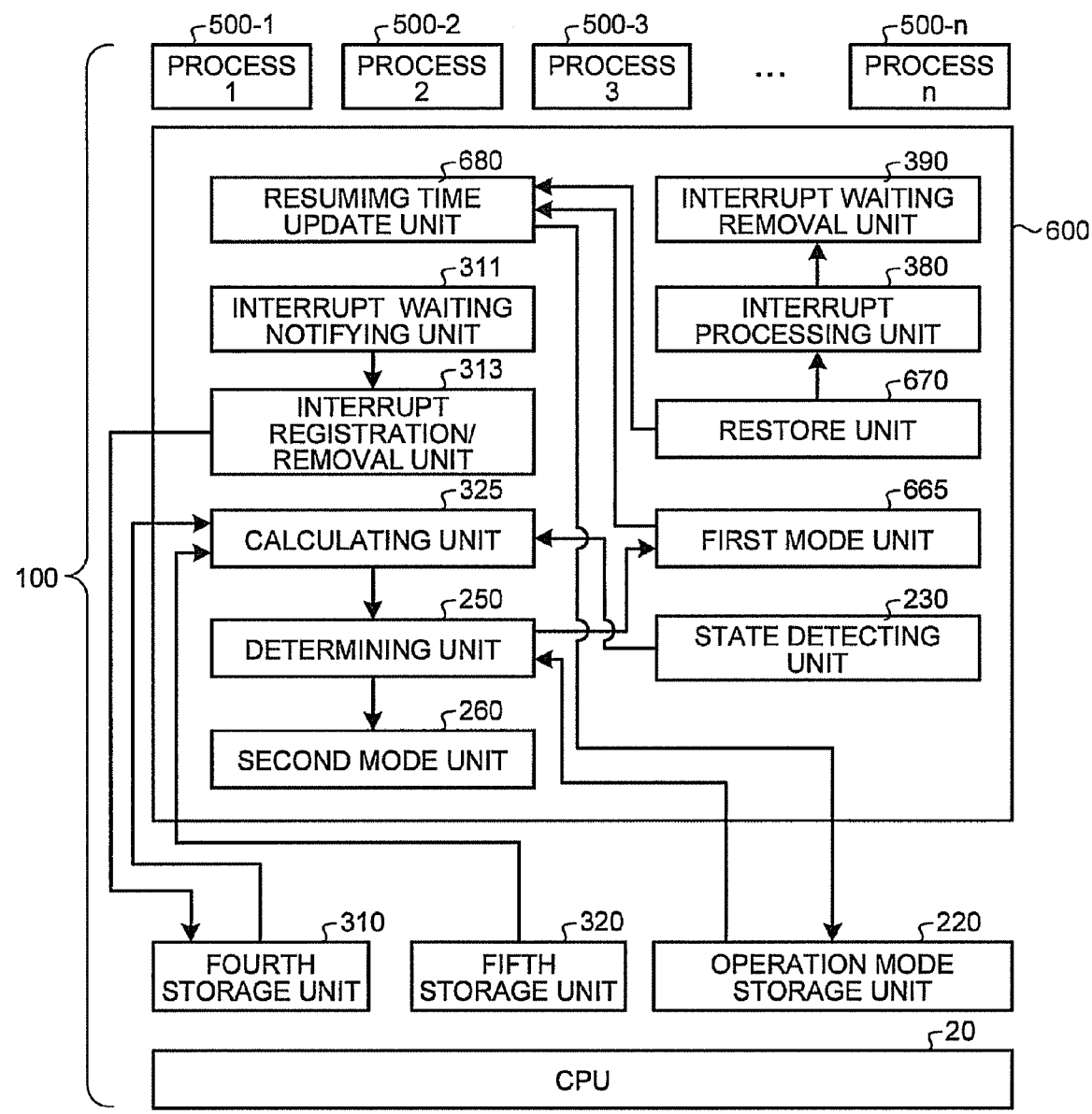
FIG. 20 is a block diagram illustrating a target system according to a fifth embodiment.

FIG. 20 is a block diagram illustrating the structure of functions implemented by a CPU 20 provided in a processor 100 to execute an OS 600 and hardware components of the processor 100. As shown in FIG. 20, the OS 600 includes a resuming time update unit 680, an interrupt waiting notifying unit 311, a interrupt registration/removal unit 313, a calculating unit 325, a determining unit 250, a second mode unit 260, a state detecting unit 230, a first mode unit 665, a restore unit 670, an interrupt processing unit 380, and an interrupt waiting removal unit 390. FIG. 20 represents that the processor 100 includes the hardware components, the OS 600 operated on the processor 100, and one or more processes operated on the OS 600.

The first mode unit 665 has a function of notifying the resuming time update unit 680 of a shift in the state of the processor 100 to the sleep state when receiving a request to temporarily stop the operation of the processor 100 from the determining unit 250, in addition to the functions described in the second embodiment. The restore unit 670 has a function of notifying the resuming time update unit 680 of the resume of the operation of the processor 100 when the data saved in the storage area 900 by the first mode unit 665 is restored to the register 120, in addition to the functions described in the second embodiment.

The resuming time update unit 680 updates the value of the resuming time stored in the operation mode storage unit 220 according to characteristic information indicating the characteristics of the processor 100 during the period from the time when the processor 100 is shifted to the sleep state and the time when the operation resumes. In this embodiment, similarly to the fourth embodiment, the power consumption of the processor 100 is used as the characteristic information.

Figure 21:
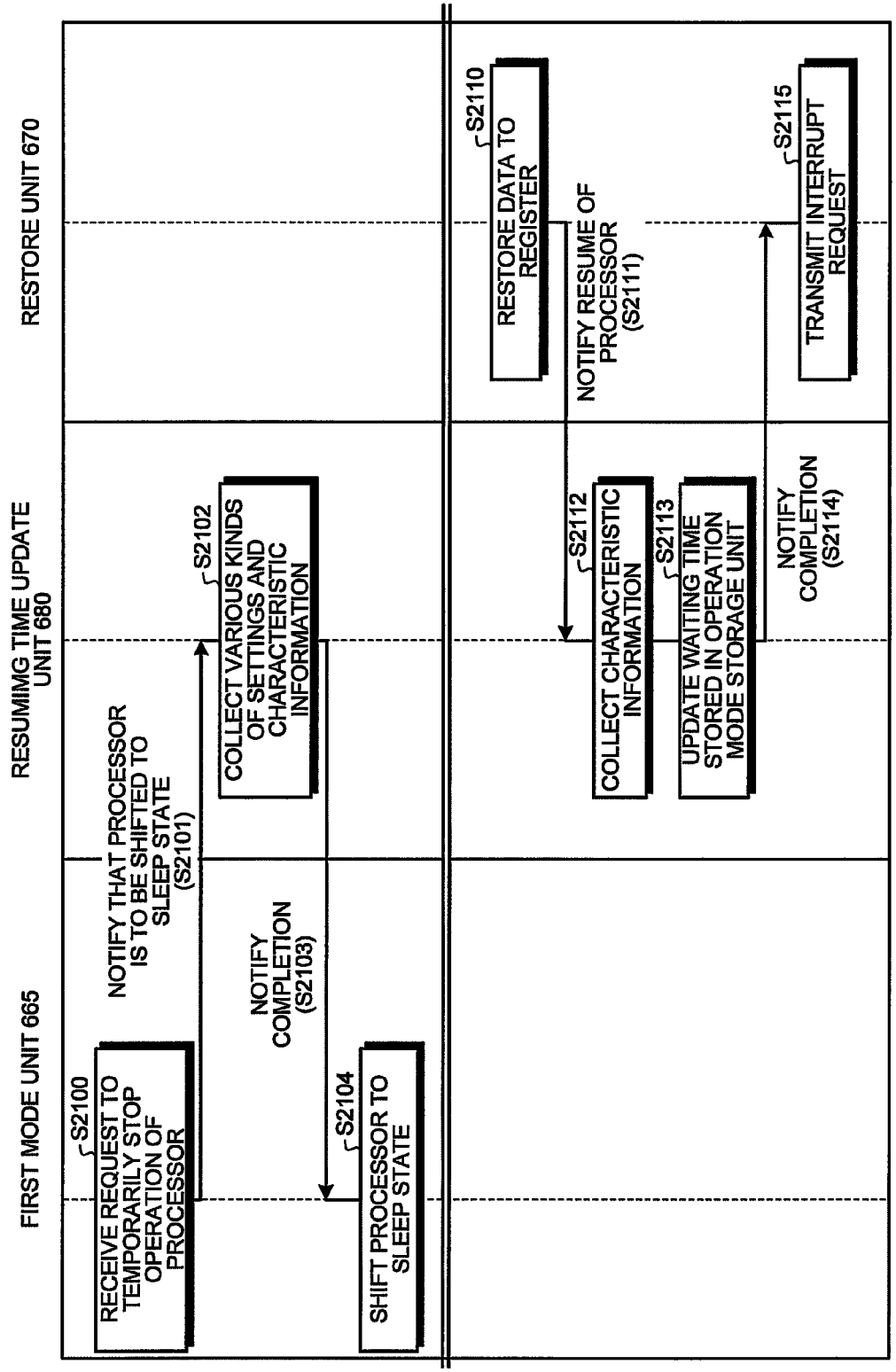
FIG. 21 is a sequence diagram illustrating the operation of the target system according to the fifth embodiment.

FIG. 21 is a sequence diagram illustrating an example of a process from the request of the temporary stop of the processor 100 to a change in the resuming time stored in the operation mode storage unit 220. As shown in FIG. 21, when receiving a request to temporarily stop the operation of the processor 100 from the determining unit 250 (Step S2100), the first mode unit 665 notifies the resuming time update unit 680 that the processor 100 is to be shifted to the sleep state (Step S2101).

Then, the resuming time update unit 680 collects the characteristic information and various kinds of settings required to change the resuming time stored in the operation mode storage unit 220 (Step S2102). This is the same as that of the collection process in the fourth embodiment. Then, the resuming time update unit 680 notifies the first mode unit 665 that the correction of various kinds of settings and the characteristic information has been completed (Step S2103). When receiving the completion notice from the change unit 680, the first mode unit 665 temporarily stops the operation of the processor 100 and shifts the state of the processor 100 to a power saving state (sleep state) (Step S2104).

Then, as described above, when the interrupt detecting unit 820 detects an interrupt and the resume unit 830 resumes the operation of the processor 100, the restore unit 670 restores the data, which is saved in the storage area 900 by the first mode unit 665, to the register 120 (Step S2110). Then, the restore unit 670 notifies the resuming time update unit 680 that the operation of the processor 100 has resumed (Step S2111).

When receiving the notice indicating that the operation of the processor 100 has resumed from the restore unit 670, the resuming time update unit 680 collects the characteristic information (Step S2112). This is the same as that of the collection process in the fourth embodiment.

Then, the resuming time update unit 680 updates the resuming time stored in the operation mode storage unit 220 on the basis of the collected characteristic information (Step S2113). This is the same as that of the change process in the fourth embodiment. When the change in the resuming time stored in the operation mode storage unit 220 is completed, the resuming time update unit 580 notifies the restore unit 670 that the change in the resuming time has been completed (Step S2114). When receiving the completion notice from the resuming time update unit 680, the restore unit 670 transmits an interrupt request to the interrupt processing unit 380 (Step S2115).

As described above, in this embodiment, similarly to the fourth embodiment, the value of the resuming time stored in the operation mode storage unit 220 is set so as to vary depending on the power consumption of the processor 100 for the period from the time when the processor 100 is shifted to the sleep state to the resume time of the operation. Therefore, it is possible to approximate the value of the resuming time stored in the operation mode storage unit 220 to the optimal value for the current target system.

Modifications

In each of the above-described embodiments, the resuming time is calculated from the timer information or by interrupt prediction, but embodiments are not limited thereto. It is only required that when the idle state of the processor 100 is detected, the resuming time indicating a time length until the next process starts is calculated and the operation mode is determined on the basis of the calculated resuming time.

Figures 22, 23:
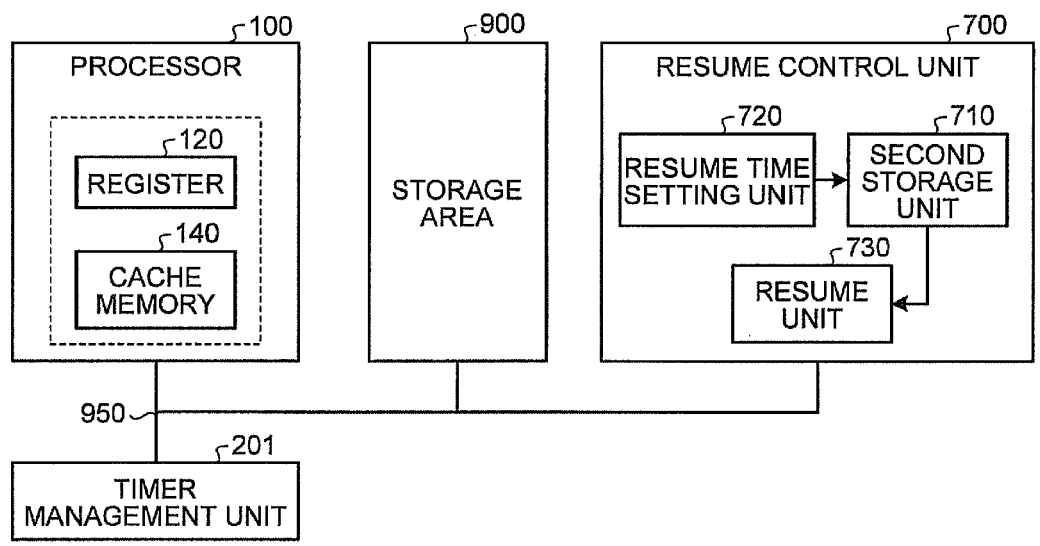
FIG. 22 is a diagram illustrating a modification of the information stored in the operation mode storage unit.
FIG. 23 is a block diagram illustrating a target system according to a modification.

For example, the shift conditions of the operation mode stored in the operation mode storage unit 220 are optional. As shown in FIG. 22, when the resuming time is equal to or less than t2, the determining unit 250 may determine the operation mode of the processor 100 to be the second mode. When the resuming time is more than t2 and less than t3, the determining unit 250 may determine the operation mode of the processor 100 to be a third mode in which frequency control is performed by DVFS. When the resuming time is equal to or more than t3, the determining unit 250 may determine the operation mode of the processor 100 to be the first mode. The example shown in FIG. 22 is also based on the following concept: when the resuming time is more than a predetermined time length (here, t2), the determining unit 250 determines the operation of the processor 100 to be the first mode; and when the resuming time is equal to or less than the predetermined time length, t the determining unit 250 determines the operation of the processor 100 to be the second mode.

In each of the above-described embodiments, the processor 100 includes the register 120 and the cache memory 140 which are volatile memories, but embodiments are not limited thereto. For example, the processor 100 may not include the cache memory 140. According to this structure, it is possible to remove the process of flushing the data stored in the cache memory 140. In addition, the register 120 or the cache memory 140 may be a non-volatile memory. According to this structure, it is possible to remove the process of saving the data stored in the register 120 or the cache memory 140 and the process of restoring the data.

At least some of the functions of the OS (200, 300, 400, 500, or 600) may be implemented by hardware other than the processor 100. For example, as shown in FIG. 23, the functions of the OS 200 according to the first embodiment may be implemented by a timer management unit 201, which is a hardware component other than the processor 100.

Figure 24:
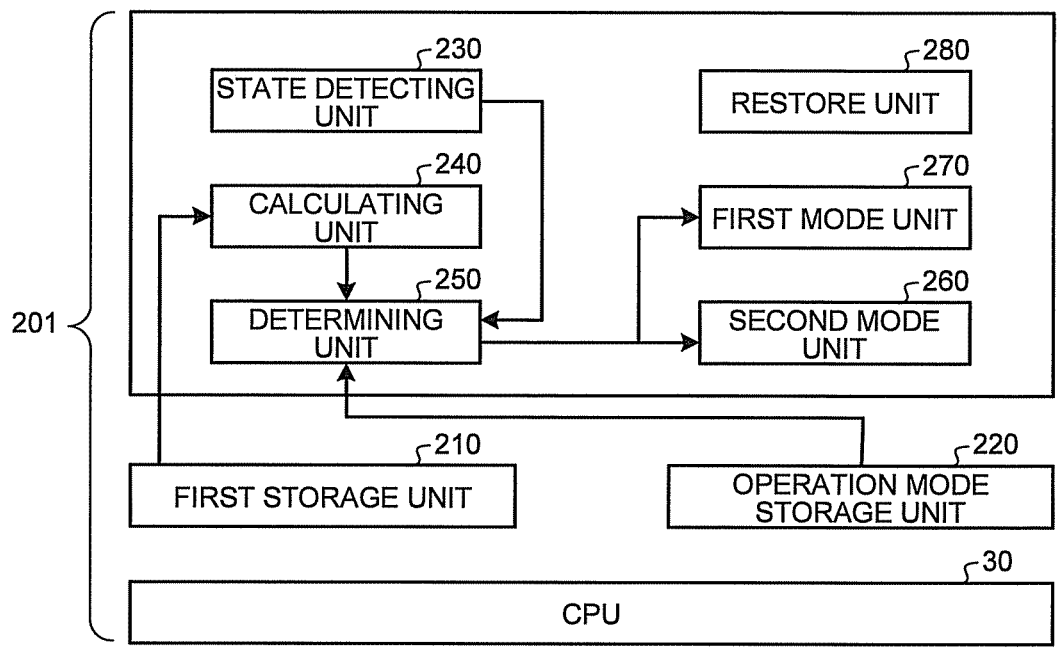
FIG. 24 is a block diagram illustrating a target system according to a modification.

FIG. 24 is a block diagram illustrating the structure of functions implemented by a CPU 30 of the timer management unit 201 to execute a program and hardware components of the timer management unit 201. As shown in FIG. 24, the hardware components of the timer management unit 201 includes the CPU 30, a first storage unit 210, and an operation mode storage unit 220. As shown in FIG. 24, the CPU 30 executes a program to implement the functions of a state detecting unit 230, a calculating unit 240, a determining unit 250, a second mode unit 260, a first mode unit 270, and a restore unit 280. In the examples shown in FIGS. 23 and 24, the timer management unit 201 may be construed as a controller. FIG. 24 represents that the timer management unit 201 includes the hardware components, the OS operated on the timer management unit 201, and one or more processes operated on the OS.

Embodiments are not limited to the examples shown in FIGS. 23 and 24. For example, only some of the functions of the OS 200 may be implemented by hardware other than the processor 100 and the other functions may be implemented on the OS 200. The same holds for the other embodiments (second to fifth embodiments).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller comprising:
a state detecting unit that detects an idle state which indicates there is no process that is executed by a processing device capable of performing one or more processes;
a fourth storage unit that stores therein an interrupt type indicating a type of an interrupt process and a time at which interrupt waiting corresponding to the interrupt type occurs;
a fifth storage unit that stores therein the interrupt type and an interrupt waiting time corresponding to the interrupt type;
a calculating unit that calculates, when the state detecting unit detects the idle state, a resuming time, which indicates a time length from a current time until a next interrupt process starts, on the basis of information stored in the fourth storage unit and information stored in the fifth storage unit; and
a determining unit that determines an operation mode of the processing device on the basis of the resuming time calculated by the calculating unit.

2. The controller according to claim 1,
wherein,
when the resuming time calculated by the calculating unit is more than a predetermined time length, the determining unit determines the operation mode to be a first mode in which the operation of the processing device is temporarily stopped and the processing device is in a power saving state, and
when the resuming time is equal to or less than the predetermined time length, the determining unit determines the operation mode to be a second mode in which the processing device maintains the idle state.

3. The controller according to claim 2, further comprising:
a first mode unit that temporarily stops the operation of the processing device such that the processing device is shifted to the power saving state when the determining unit determines the operation mode to be the first mode;
a resume unit that cancels the first mode and resumes the operation of the processing device shifted to the power saving state by the first mode unit when the interrupt process starts; and
a interrupt registration/removal unit that registers the type of interrupt that is waiting and the time at which the interrupt waiting occurs to the fourth storage unit when the interrupt waiting occurs, and removes the type of interrupt which occurs and the time at which the interrupt waiting corresponding to the interrupt type occurs from the fourth storage unit when the interrupt process starts.

4. The controller according to claim 2, further comprising a second mode unit that maintains the idle state of the processing device when the determining unit determines the operation mode to be the second mode.

5. The controller according to claim 1, further comprising an update unit that calculates an interrupt waiting time from the time at which an interrupt process specified by the interrupt type starts and the time at which the interrupt waiting occurs, and updates the interrupt waiting time stored in the fifth storage unit with the calculated interrupt waiting time.

6. The controller according to claim 1, further comprising a resuming time update unit that updates the predetermined time length according to characteristic information indicating characteristics of the processing device during a period from the time at which the operation of the processing device is temporarily stopped and the processing device is shifted to the power saving state to the time at which the operation resumes.

7. The controller according to claim 6, wherein the characteristic information is power consumption of the processing device.

8. A program product having a non-transitory computer readable medium including programmed instructions, wherein the instructions, when executed by a computer, causes the computer to perform:
detecting an idle state which indicates there is no process that is executed by a processing device capable of performing one or more processes;
calculating, when the idle state is detected, a resuming time, which indicates a time length from a current time until the next interrupt process starts on the basis of information stored in a fourth storage unit that stores therein an interrupt type indicating a type of an interrupt process and a time at which interrupt waiting corresponding to the interrupt type occurs and on the basis of the information stored in a fifth storage unit that stores therein the interrupt type and an interrupt waiting time corresponding to the interrupt type; and
determining an operation mode of the processing device on the basis of the resuming time calculated by the calculating.

* * * * *